(12) United States Patent
Ballew et al.

(10) Patent No.: US 8,731,817 B2
(45) Date of Patent: May 20, 2014

(54) INDOOR LOCALIZATION WITH WAYFINDING TECHNIQUES

(76) Inventors: Aaron E. Ballew, Chicago, IL (US); Aleksander Kuzmanovic, Evanston, IL (US); Shiva Srivastava, Lexington, SC (US); Chung Chieh Lee, Long Grove, IL (US); Nikolay A. Valtchanov, San Francisco, CA (US)

( * ) Notice: Subject to any disclaimer, the term of this patent is extended or adjusted under 35 U.S.C. 154(b) by 474 days.

(21) Appl. No.: 12/932,710

(22) Filed: Mar. 3, 2011

(65) Prior Publication Data

US 2011/0276266 A1    Nov. 10, 2011

Related U.S. Application Data

(60) Provisional application No. 61/339,344, filed on Mar. 3, 2010.

(51) Int. Cl.
  G06F 17/00    (2006.01)
  G06F 19/00    (2011.01)
  G01C 21/00    (2006.01)

(52) U.S. Cl.
  USPC ........... 701/409; 701/420; 701/426; 701/428; 701/434; 701/522; 340/995.27

(58) Field of Classification Search
  USPC ............. 701/1, 400, 408, 409, 410, 411, 416, 701/418, 420, 421, 425, 426, 428, 431, 432, 701/433, 434, 436, 439, 445, 450, 451, 452, 701/453, 454, 457, 461, 467, 483, 484, 485, 701/487, 522, 532, 533, 537, 538, 300; 340/995.1, 995.14, 995.19, 995.2, 340/995.21, 995.23, 995.28, 996

See application file for complete search history.

(56) References Cited

U.S. PATENT DOCUMENTS

| | | | |
|---|---|---|---|
| 5,806,017 A * | 9/1998 | Hancock | 701/428 |
| 6,609,090 B1 * | 8/2003 | Hickman et al. | 704/9 |
| 6,898,518 B2 | 5/2005 | Padmanabhan | |
| 7,245,923 B2 | 7/2007 | Frank et al. | |
| 7,620,493 B2 | 11/2009 | Stankiewicz et al. | |
| 7,755,517 B2 | 7/2010 | Sarin et al. | |
| 7,851,758 B1 * | 12/2010 | Scanlon et al. | 250/330 |
| 2002/0080032 A1 * | 6/2002 | Smith et al. | 340/572.1 |
| 2003/0033079 A1 | 2/2003 | Endicott | |
| 2006/0069503 A1 | 3/2006 | Suomela et al. | |
| 2006/0135183 A1 | 6/2006 | Zavada et al. | |
| 2007/0018890 A1 | 1/2007 | Kulyukin | |
| 2008/0120029 A1 | 5/2008 | Zelek et al. | |
| 2008/0281515 A1 | 11/2008 | Ann et al. | |
| 2008/0288165 A1 * | 11/2008 | Suomela et al. | 701/201 |
| 2009/0043504 A1 | 2/2009 | Bandyopadhyay et al. | |
| 2009/0138353 A1 | 5/2009 | Mendelson | |

(Continued)

OTHER PUBLICATIONS

International Search Report and Written Opinion, PCT/US2011/00414, mailed May 27, 2011.

*Primary Examiner* — Thomas Tarcza
*Assistant Examiner* — Edward Pipala
(74) *Attorney, Agent, or Firm* — Krieg DeVault, LLP

(57) ABSTRACT

A user proceeds from one location to another location inside of a building by traveling in a sequence of several hops in response to different visual cues. A portable handheld device may provide the visual cues to the user. The user reaches the destination through the sequence of hops using the portable handheld device.

24 Claims, 14 Drawing Sheets (b) Application Interface

(56) References Cited

U.S. PATENT DOCUMENTS

| | | |
|---|---|---|
| 2009/0144143 A1 | 6/2009 | Iyer |
| 2009/0177383 A1 | 7/2009 | Tertoolen |
| 2009/0216438 A1 | 8/2009 | Shafer |
| 2010/0023249 A1 | 1/2010 | Mays et al. |
| 2010/0121567 A1* | 5/2010 | Mendelson .................. 701/206 |

* cited by examiner (b) Application Interface (a) Backbone Adjacencies (b) Source and Destination

INDOOR LOCALIZATION WITH WAYFINDING TECHNIQUES

CROSS-REFERENCE TO RELATED APPLICATIONS

The present application claims the benefit of U.S. Provisional Patent Application No. 61/339,344, filed Mar. 3, 2010, and the same is incorporated herein by reference in its entirety.

BACKGROUND

The present application is directed to localization and/or wayfinding, and more particularly, but not exclusively, directed to the communication of visual cues to a user's portable, hand-held device to provide for localization and/or wayfinding indoors, such as inside a building.

A Global Positioning Satellite (GPS) device is typically an effective method of localization and wayfinding in outdoor environments. GPS has become commonplace in consumer life, most prominently applied to vehicle navigation, and increasingly found in mobile phone applications. A conspicuous weakness of GPS is its poor performance indoors. Typically, no connection can be made, and the mobile unit is untrackable. The value of determining one's location indoors is wide-ranging. Consider a supermarket customer looking for the dairy section, a hurried traveler lost in an airport, or a parent and child separated at the mall. Social networking services benefit, for example, by enabling indoor "meet-ups." To address this challenge, RF-based schemes have been proposed using varieties of radio triangulation and spectral fingerprinting. Such schemes, while technically attractive, have not seen widespread adoption in places where the demand is great: supermarkets, shopping malls, airports, etc.

Triangulation operates off of radio beacons deployed within or around the indoor environment. Funding and gaining permission to install RF infrastructure is a significant obstacle to commercial deployment. Some proposals may address this shortcoming by reusing existing beacons, (e.g., wi-fi, cellular), but a typical supermarket may have only one wi-fi AP for the entire building—if any. Moreover, cell triangulation can be imprecise indoors. RF fingerprinting compares characteristics of a location's spectral content to a predetermined map of radio signatures. While RF fingerprinting requires no infrastructure, pre-computation of radio signatures can be difficult, so considerable manual effort may be necessary in order to build the map for each new environment. Thus, there is a ongoing demand for further contributions in this area of technology.

SUMMARY

One embodiment of the present application is directed to a unique localization and/or wayfinding technique. Other embodiments include unique methods, processes, devices, systems, and apparatus for indoor localization and/or wayfinding. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION OF REPRESENTATIVE EMBODIMENTS

Figure 1:
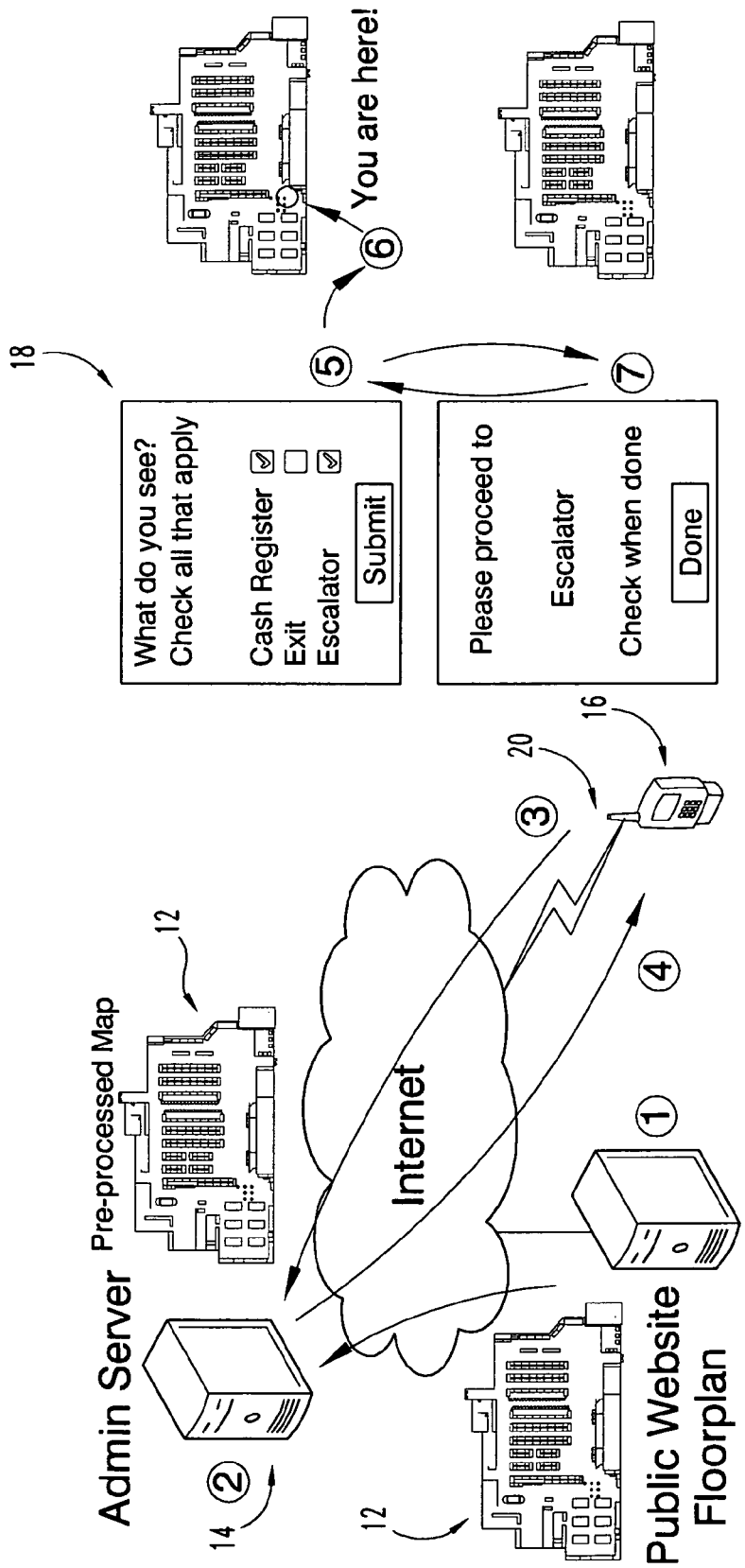
FIG. 1 is diagrammatic view of a system for localization and/or wayfinding.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Many businesses willingly provide a simple floorplan to customers. In shopping malls, for example, this is a large mounted display near each entrance, depicting the location of bathrooms, stores, the food court, etc. The floorplan generally includes no reference to absolute scale, but customers are not interested in pinpoint accuracy. They need only enough information to identify their destination and/or become "un-lost."

Floorplans often contain enough information, stored in the form of intervisibility relationships, to successfully localize on a relative scale meaningful to human users. Typically, success is not defined as achieving absolute, quantified precision; rather, a successful localization is one which allows the user to comprehend his or her position relative to the indoor environment of interest. To illustrate, consider the boundary example of a user in an empty room. Without knowing his or her absolute position within the room in an absolute, quantifiable way, he or she is still not "lost."

In one embodiment of the present application, a system 10 is composed of three "participants" or components: (a) a public website hosting a floorplan or map 12 or similar floorplan source, (b) a supervising/coordinating element 14, such as a System Administrator (Admin) that may be a third party or similar service provider, and (c) a user carrying the device 16 (such as a cell phone, smartphone, or the like) loaded with the localization and wayfinding application 18 (User).

FIG. 1 illustrates a sequence of events of certain embodiments of the present application as indicated by operations (1)-(7): (1) 3rd party. System Administrator (Admin) 14 downloads a free floorplan 12 from the public website. (2)

The floorplan 12 is processed for visibility characteristics, encoded, and hosted on the Admin website. (3) User gets lost, and checks the mobile phone application 18 for the building of interest. If not previously loaded, the application queries the Admin website for the building's floorplan. (4) If available, the pre-processed floorplan is copied to the mobile phone 16 over a 3 G/4 G data connection 20. (5) The application 18 offers User a selection of room features. User identifies what features he sees. (6) The application 18 highlights a region of the map 12 which satisfies User's report, or (7) the application 18 recommends a next-hop towards the desired destination. Operations illustrated are understood to be exemplary only, and operations may be combined or divided, and added or removed, as well as re-ordered in whole or in part, unless explicitly stated to the contrary.

Figure 1A:
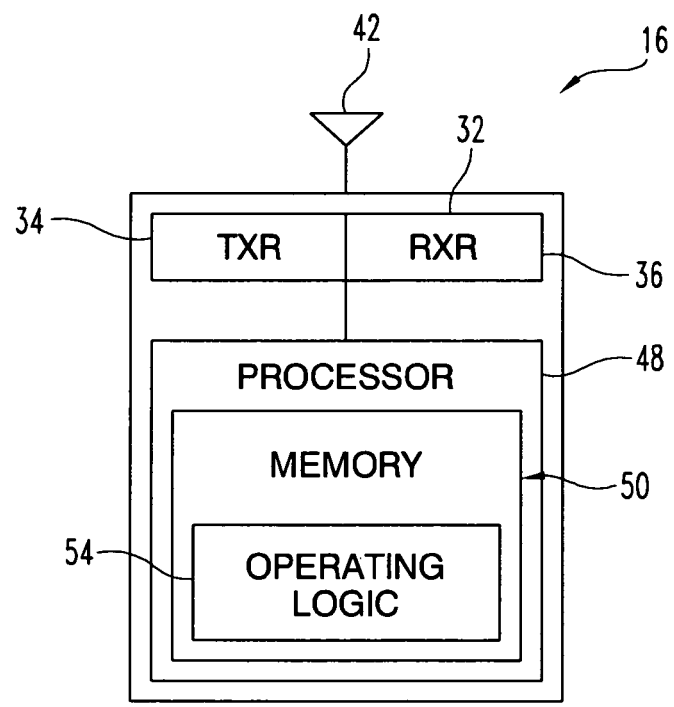
FIG. 1(a) is a schematic diagram of a portable handheld device.

Referring additionally to FIG. 1a, further details of the device 16 are depicted. Device 16 includes a transmitter (TXR) 34 and a receiver (RXR) 36 integrated to define a transceiver 32. In other embodiments, transmitter 34 and receiver 36 may be separate from one another. Device 16 further includes a processing device 48 in operative communication with transceiver 32. Processing device 48 includes memory 50. Memory 50 stores at least a portion of the floorplan 12 and application 18. Furthermore, processing device 48 executes operating logic 54 to perform various routines with device 16, including those further described as follows.

Transceiver 32 sends communication signals to and receives communication signals from antenna 42, and communicates with processing device 48 to provide desired encoding of information/data in the signals, as might be desired for various applications of system 10. Processing device 48 includes appropriate signal conditioners to transmit and receive desired information (data), and correspondingly may include filters, amplifiers, limiters, modulators, demodulators, CODECs, signal format converters (such as analog-to-digital and digital-to-analog converters), clamps, power supplies, power converters, and the like as needed to perform various control, communication, and regulation operations described herein. Processing device 48 can be comprised of one or more components of any type suitable to process the signals received from transceiver 32 or elsewhere, and provide desired output signals. Such components may include digital circuitry, analog circuitry, or a combination of both. Processing device 48 can be of a programmable type; a dedicated, hardwired state machine; or a combination of these; and can further include multiple processors, Arithmetic-Logic Units (ALUs), Central Processing Units (CPUs), or the like. For forms of processing device 48 with multiple processing units, distributed, pipelined, and/or parallel processing can be utilized as appropriate. Processing device 48 may be dedicated to performance of just the operations described herein or may be utilized in one or more additional applications. In the depicted form, processing device 48 is of a programmable variety that executes algorithms and processes data (e.g., floorplan 12) in accordance with operating logic 54 as defined by programming instructions (such as software or firmware like application 18) stored in memory 50. Alternatively or additionally, operating logic 54 for processing device 48 is at least partially defined by hardwired logic or other hardware.

Memory 50 may be of one or more types, such as a solid-state variety, electromagnetic variety, optical variety, or a combination of these forms. Furthermore, memory 50 can be volatile, nonvolatile, or a mixture of these types, and some or all of memory 50 can be of a portable variety, such as a disk, tape, memory stick, cartridge, or the like. In addition to identifier 52, memory 50 can store data that is manipulated by the operating logic 54 of processing device 48, such as data representative of signals received from and/or sent to transceiver 32 in addition to or in lieu of storing programming instructions defining operating logic 54, just to name one example.

One form of implementation presumes the user knows what macro-level building he is in, i.e., which airport, which supermarket, etc.—while other implementations may further provide the user guidance in this regard as well. Typically, the preprocessed map may be preloaded or stored from a previous session; and otherwise the application checks the Admin website (or other source) and downloads the information over a 3 G/4 G data connection. Such data connections are commonly available on mobile phones and effectively penetrate most buildings. Even if in-building penetration is poor, the user has the option of preloading the map by 3 G/4 G or other wireless or hardwired means before entering the building.

It should be appreciated that while this system depends to some extent on the availability of a floorplan or similar mapping, its utility may incent businesses and/or other interested parties to participate by making such information more readily available. Because absolute scale is not required, the floorplans can be easy to generate compared to sophisticated blueprints or hand-built RF signature maps. Further, because this information can be stored in terms of intervisibility relationships, considerable inaccuracy would not provide unsatisfactory results.

Focusing more particularly on visibility localization embodiments of the present application, and environmental/computational model is considered. Because visibility requires line-of-sight, complications due to multipath can be ignored. Human vision also offers the particular advantage of being an effective noise filter. Consider that humans have little trouble identifying a static landmark, even as other people walk past it. The environmental and computational model is based on four constructs: Isovist, Feature, Feature Vector, and Region.

DEFINITION 1 (ISOVIST). $V_{(i,j)}$, the visible subset of an environment as viewed from point (i, j)

DEFINITION 2 (FEATURE). An identifiable object, $f_v$, that can obstruct or be obstructed by an element in the environment DEFINITION 3 (FEATURE VECTOR). $F_{(i,j)}$, an h-entry array representing the visible subset of Features as viewed from point (i, j), where h is the total number of defined Features in the environment $$F_{(i,j)} \equiv [\, f_0 \quad f_1 \quad \ldots \quad f_{h-1} \,], f_v = \begin{cases} 1 & \text{if visible} \\ 0 & \text{if invisible} \end{cases}$$

DEFINITION 4 (REGION). The subset of occupiable coordinates implied by a Feature Vector The downloaded 2D floorplan is first discretized and overbounded by a $\sqrt{n} \times \sqrt{n}$ grid. Any coordinates falling outside the boundary of the indoor environment are invisible from all interior vantage points, and safely ignored. Then, h Features, $f_v$, are identified, where v=0, 1 ... (h−1). Variable h is used to maintain consistency with visibility literature, i.e., visibility "holes." Features include human-identifiable characteristics, derived from labels on the floorplan. Any "feature" that cannot obstruct or be obstructed, such as an image on the ceiling viewable from all vantage points, provides no information and is ineligible to be a Feature.

Isovist represents the viewable area from a vantage point. Of particular interest is how Isovists overlap. Each occupiable coordinate is encoded as a Feature Vector storing the subset of Features contained within its isovist. A user's report is itself a Feature Vector, and therefore implies a subset of coordinates that could generate such a vector. This subset of coordinates is the common Region in which the user is located. Definition 4 is intentionally vague, as the specific interpretation of "Region" depends on the method of deduction implemented.

Equivalently, calculating isovists from the perspective of each Feature results in a set of visible coordinates associated with each Feature. Given a user-reported Feature Vector, $F_{rep}$, the located Region is calculable by set-algebra. This "duality" of intervisibility corresponds to intuition; if you can see a Feature, the Feature can see you. Likewise, if you cannot see a Feature, the Feature cannot see you.

PRINCIPLE 1 (DUALITY). If $f_v \in V_{(i,j)}$, then $(i,j) \in V_{f_v}$.

Exceptions to Principle 1 are later considered. With the environmental model in place, three methods of locating a user are considered as follows: (a) perfect reporting, (b) accumulative reporting, and (c) accumulative with limited input. For perfect reporting, reports of $f_v=1$, mean the Feature is definitely visible. For reports of $f_v=0$, the Feature is definitely invisible. Consequently, a "Region" is defined for this case as a subset of coordinates with identical Feature Vectors. At this time, it is also convenient to introduce the "Isovist-complement".

DEFINITION 5 (ISOVIST-COMPLEMENT). $V'_{(i,j)}$, the invisible subset of an environment as viewed from point (i,j)

For all user-reported $f_p=1$, $f_q=0$, where p, q=0, 1 . . . , the located Region $R_{pq}$ is:

$$R_{pq} = \left(\bigcap_{\forall p} V_{f_p}\right) \cap \left(\bigcap_{\forall q} V'_{f_q}\right) \quad (1)$$

Figure 3:
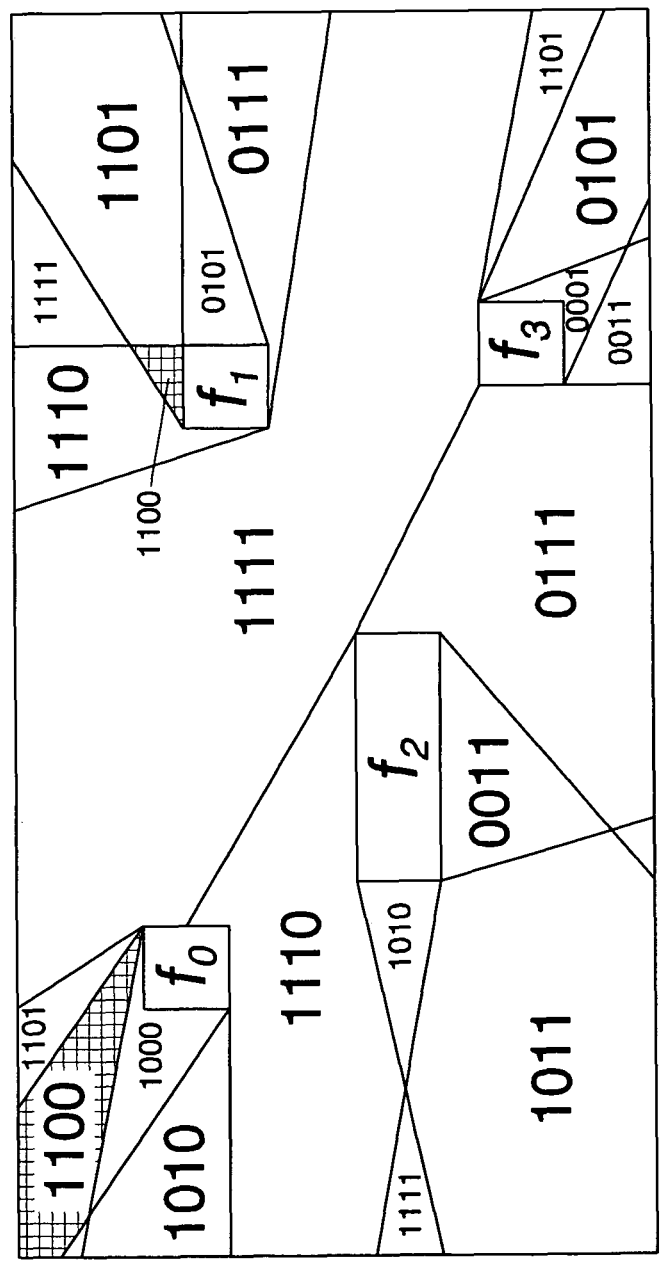
FIG. 3 is a schematic diagram of a floorplan.

FIG. 3 illustrates the technique. A room with h=4 Features is partitioned by isovists $V_{f_0}$, $V_{f_1}$, $V_{f_2}$, and $V_{f_3}$. The resulting disjoint Regions are labeled with their corresponding Feature Vectors. A user reports positive sightings of $f_0$, $f_1$, and the located Region is highlighted. With only h=4, the located Region is already very small compared to the total occupiable area. User reports $F_{rep}=[1\ 1\ 0\ 0]$. Note that a given Region may be discontiguous. Such ambiguities diminish in both size and occurrence as h grows. Remaining ambiguities are resolved by the wayfinding procedure, described hereinafter.

Each Feature Vector is a binary array of length h, implying that the maximum number of Regions possible in a given environment is $2^h$. With the number of Regions growing exponentially in h, the average area per Region shrinks exponentially. To measure the potential performance of the system, given a particular environment, consider the following definition:

DEFINITION 6 (AVERAGE PRECISION). $\overline{P}$, the ratio of the average area among all Regions and the total occupiable area, $0 < \overline{P} \leq 1$ In an environment with the maximum $2^h$ Regions, $\overline{P}_{min}$ is clearly $$\frac{1}{2^h}$$

The environment of FIG. 3, however, does not generate $2^4=16$ Regions. Indeed, there are only 11 Regions, and this is typical of environments where h>3. Note also that any environment with a convex boundary can never generate more than $2^h-1$ Regions, because there is no vantage point from which all Features are invisible. i.e., $f_{(i,j)}=[0 \ldots 0]$ is impossible.

Let SR be the set of all Regions generated; then $[SR] \leq 2h$, and $$\overline{P} = \frac{1}{|S_R|} \geq \overline{P}_{min} \quad (2)$$

Figure 4A:
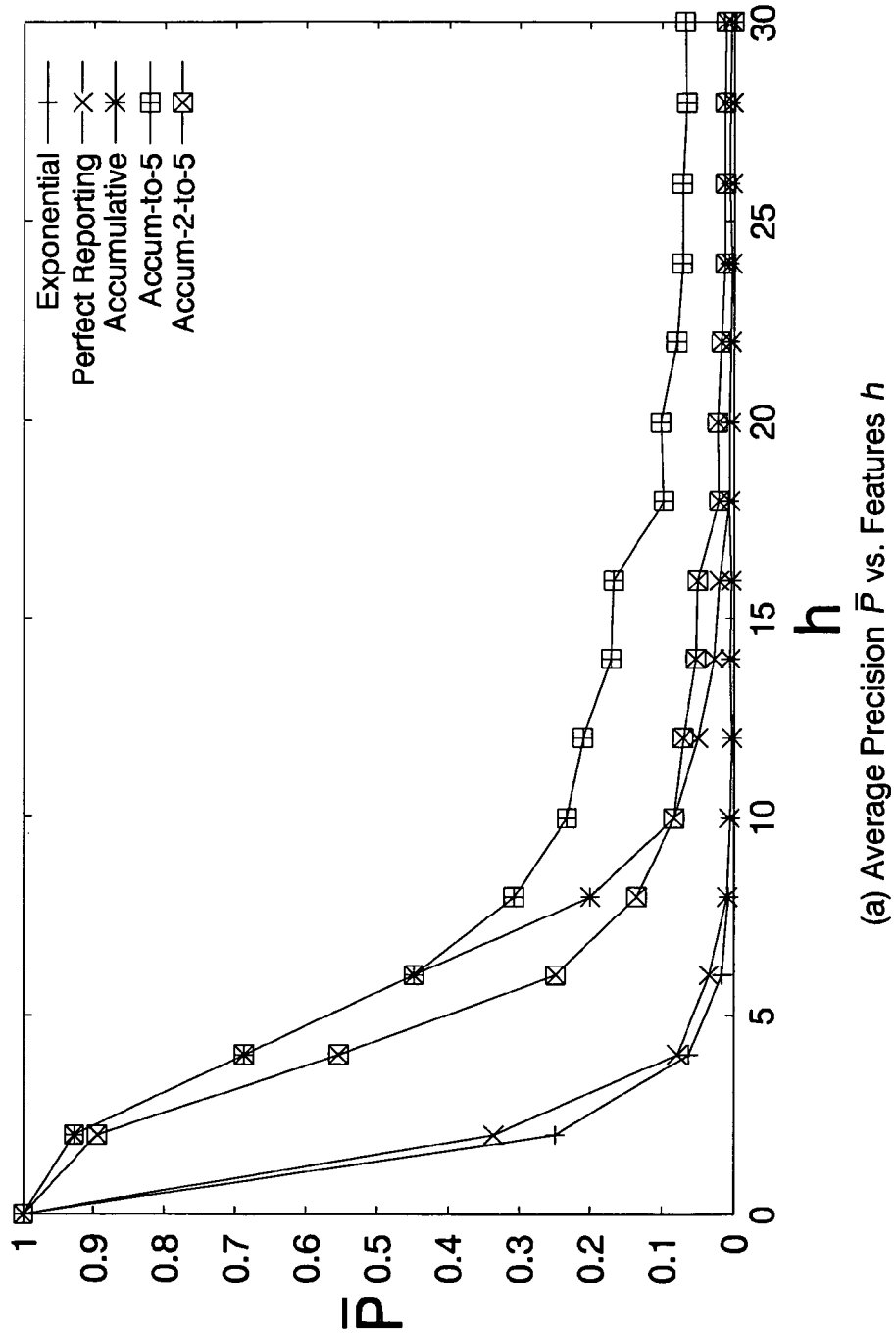
FIG. 4(a) is a graph of illustrative data showing average precision.

Although in general $\overline{P}$ cannot achieve the minimum, little precision is lost in practice. Simulations using a neutral repeating pattern of Features ranging from $0 \leq h \leq 30$ show that $$\frac{1}{S_R}$$

tracks closely behind $$\frac{1}{2^h}$$

in a quasi-exponential decay. The simulation implements an empty room for h=0, two identical square Features for h=2, four squares for h=4, and so on. In FIG. 4(a), Perfect Reporting shows the resulting precision as h increases. $\overline{P}$ improves rapidly with h, stabilizing near minimum beyond h≈10. It is concluded that the performance of the system improves with increasing complexity in the environment.

Finally, observe that for small h each $V_{f_v}$ contains a relatively large set of coordinates. Each corresponding $V'_{f_v}$ necessarily contains a relatively small set of coordinates. For large h, the relationship reverses. Consequently Eq. (1) can be transformed to operate entirely in the "visibility" or "invisibility" domain. Depending on which offers computationally convenient sets, either domain can be favored opportunistically to improve run-time. A related observation is made in [4], regarding the value of invisibility graphs.

PRINCIPLE 2 (EQUIVALENCE). For a given v, $V_{f_v}$ and $V'_{f_v}$ convey the same information relating to Eq. (1), $$R_{pq} = \left(\bigcap_{\forall p} V_{f_p}\right) \cap \left(\bigcap_{\forall q} V'_{f_q}\right) \quad (3)$$

$$= \left(\bigcap_{\forall p} V_{f_p}\right) \backslash \left(\bigcup_{\forall q} V_{f_q}\right) \quad (4)$$

$$= \left(\bigcap_{\forall q} V'_{f_q}\right) \backslash \left(\bigcup_{\forall p} V'_{f_p}\right) \quad (5)$$

Figure 2:
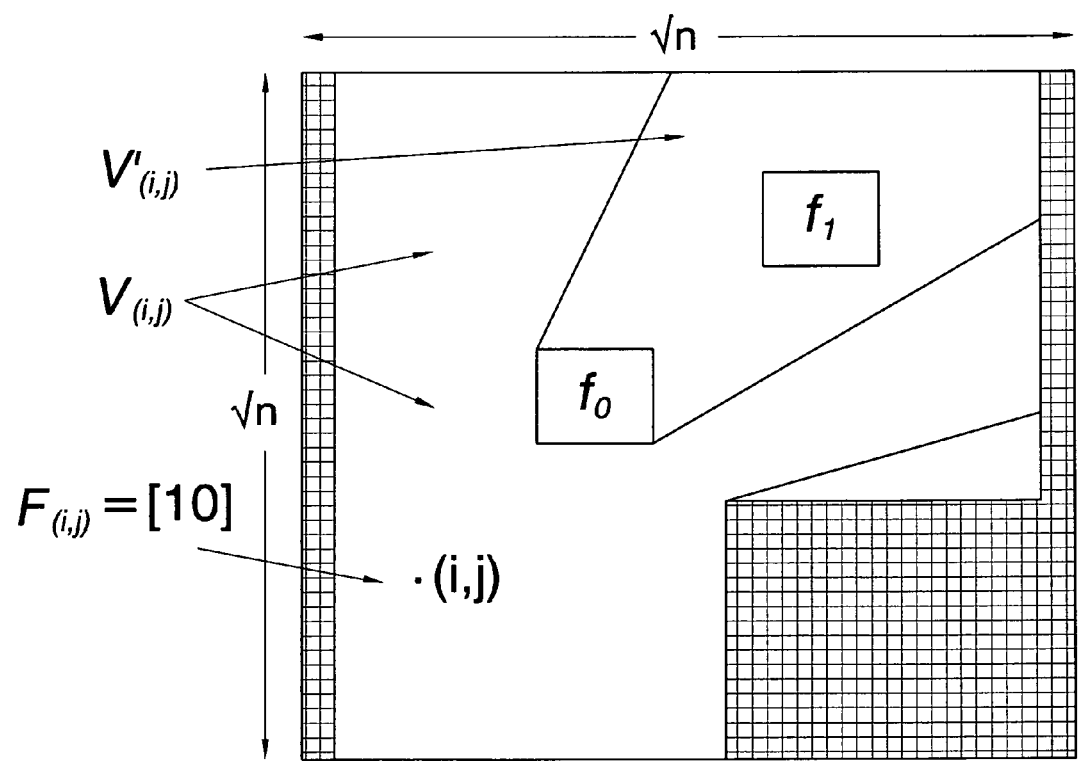
FIG. 2 is a schematic diagram of a floorplan.

To visualize Principle 2, refer to FIG. 2. $V'_{(i,j)}$ is the remaining occupiable area. Either is easily derived from the other. In addition, FIG. 2 shows a floorplan with overbounding box, Isovist $V_{(i,j)}$, complement $V'_{(i,j)}$, h=2 features, and feature vector $f_{(i,j)}$.

Turning next to accumulative reporting, it should be appreciated that in practice, there is a risk of reporting error. The user commits a "Type I Error" by reporting that an invisible feature is visible. The user commits a "Type II Error" by reporting that a visible feature is invisible. Field trials confirm Type I errors are rare, while Type II errors occur quite frequently. In a view densely populated with features, it is reasonable that a human user will overlook something.

A reporting error processed by the deterministic technique previously described under "Perfect Reporting" outputs not only a less accurate result, but one that is "uniquely wrong." This is a consequence of the disjoint nature of Regions. So, a probabilistic model is adopted in which Pr(Type I)=c and Pr(Type II|(i,j), $f_v$)=g(x); where c represents a small constant because Type I errors are assumed unlikely. With Type II errors more likely, x is a variable depending on some relationship between coordinate (i,j) and Feature $f_v$. For any (i,j), the probability of reporting error can be computed relative to any Feature, in which case, given a user-reported Feature Vector, $F_{rep}$, a posteriori Bayesian application yields $Pr((i,j) | F_{rep})$.

The resulting data shows the likelihood of occupying each coordinate given $F_{rep}$, but all coordinates are now feasible. Further, the generating function g(x) can be difficult to obtain. It is not well understood what causes a person not to notice something which is, strictly speaking, within his field of view. To address this complication, all information associated with a report of an unnoticed, "invisible" Feature $f_u$ is sacrificed. In other words, $Pr(TypeII|f_q=0)=\frac{1}{2}$.

Positive sightings, however, are considered trustworthy. Regardless of the exact value of c, the report that $f_v$ is visible will be taken as true. The exact value of c is thus irrelevant, so let Pr(TypeI)=0. It follows that a Region is defined for this case as the subset of coordinates(i,j) such that $F_{rep}$ & $F_{(i,j)}=F_{rep}$, where & is bitwise AND. To illustrate, $$F_{rep} = [1\ 1\ 0\ 0] \supseteq \begin{Bmatrix} [1100], & [1101] \\ [1110], & [1111] \end{Bmatrix}$$

$F_{rep}$ becomes a superset implying all Feature Vectors $F_{(i,j)}$ sharing $F_p=1$. Regions are no longer disjoint, and $\overline{P}$ should suffer. This is partly confirmed by FIG. 4(a): Accumulative for small h, but surprisingly, $\overline{P}$ still decays rapidly. Beyond h≈10, $\overline{P}$ stabilizes near the precision achieved by Perfect Reporting. As a result, even under constraints typically imposed by human error, the system performs well for a sufficiently complex environment.

Accumulative reporting with limited input is next considered. Realism demands acknowledgement of users' limited patience. For large h, some Feature Vectors require many positive sightings in order to be invoked, i.e., "feasible" Feature Vectors may be "implausible." For this reason, the effect of eliminating from consideration any feasible user reports containing >5 positive sightings was investigated. These are highly informative reports which often imply the most precise Regions, so their removal should negatively impact precision.

FIG. 4(a): Accum-to-5 shows that the resulting $\overline{P}$ underperforms the unlimited case as expected. For example, $\overline{P}$ is nearly 0.10 when h=20. However, adding the reasonable constraint that a user must report ≥2 positive sightings brings $\overline{P}$ back in line with the unlimited case. For h=20, FIG. 4(a): Accum-2-to-5 $\overline{P}$=0.02; which implies the system can run successfully in the unlimited Accumulative Reporting mode, because the plausible range of operation offers equivalent performance. Despite limited information, this practical technique performs well compared to the ideal, improving as complexity increases in the environment.

A discussion of complexity is warranted because of the desire in certain embodiments that the application run on a commercially available mobile phone. Calculating isovists reduces computationally to solving a "visibility graph" of which there are many polynomial-time algorithms in $O(n^2)$ or better. Consistency with this notation motivates the $\sqrt{n}\times\sqrt{n}$ overbounding previously described. Isovists, however, are computed during pre-processing.

This approach can give a run-time advantage and conserve battery life. On a mobile phone application, the worst case computation is a search through $2^h$ potential Feature Vectors. While $2^h$ grows exponentially, the number of possible Feature Vectors in a given environment is bounded by the number of occupiable coordinates, at most $\sqrt{n}\times\sqrt{n}=n$.

Let $n_h$ be the smallest number of coordinates occupied by h Features. For h≥k, where $2^{k-1}+(k-1)<n\leq 2^k+k$, $$\min[2^h, n-n_h] = n - n_h \Rightarrow O(n) \qquad (6)$$

Graph-based modeling of architectural space is widely supported. Existing treatments on human navigation have considered how to generate effective semantic route descriptions along collision-free paths. This strategy can be linked to turn-by-turn driving directions where the user is instructed to "Turn right at Main Street." Indoors, this might materialize as "Walk down the hallway, turn right at the bookcase." In both cases, success relies on each element of the route description being comprehensible and identifiable on the fly. There is no guarantee a given user can follow the instructions, and a missed turn can long go unnoticed.

To streamline routing instruction, only those elements are incorporated that have been positively sighted by the user. Any sighted element can serve as a potential "next-hop" toward the destination. A sequence of such sightings and next-hops comprises a path. The resulting navigation procedure is typically easy to follow, even for users who struggle with traditional maps and directions.

Let G(h,e) be a graph of h nodes and e edges, where h is the number of Features in the environment. An edge appears between a Feature and any other Feature within its isovist. Any such edge is undirected, as demonstrated by the following corollary to Principal 1.

COROLLARY 1 (DUALITY). If $f_i \epsilon V_{fj}$, then $fj \epsilon V_{fi}$

Figure 5A:
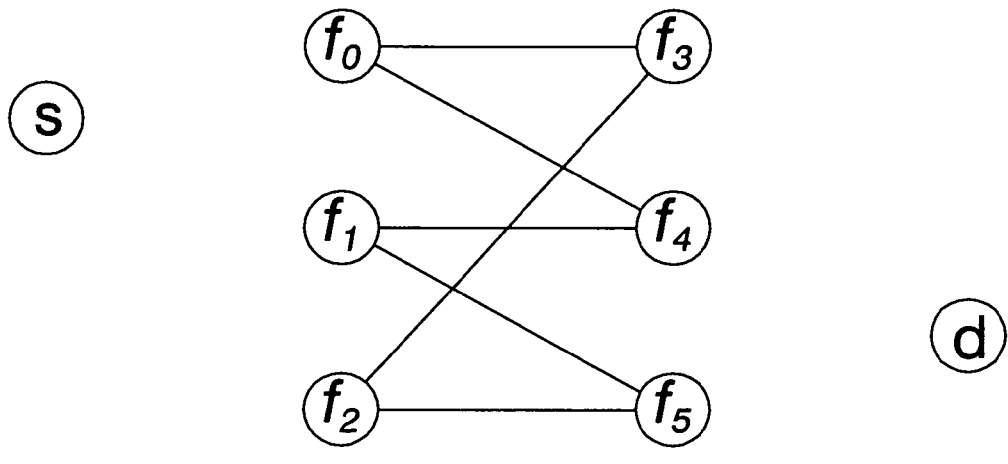
FIG. 5(a) is a graph showing illustrative backbone adjacencies.

G(h,e) serves as a "backbone" network because the origination and destination points are not necessarily colocated with Features, i.e., they may not be "on-net". FIG. 5(a) illustrates the backbone concept as a bipartite graph with off-net source and destination. Bipartiteness is not required, and chosen here only to reinforce the notion of a backbone with an access layer.

Figure 5B:
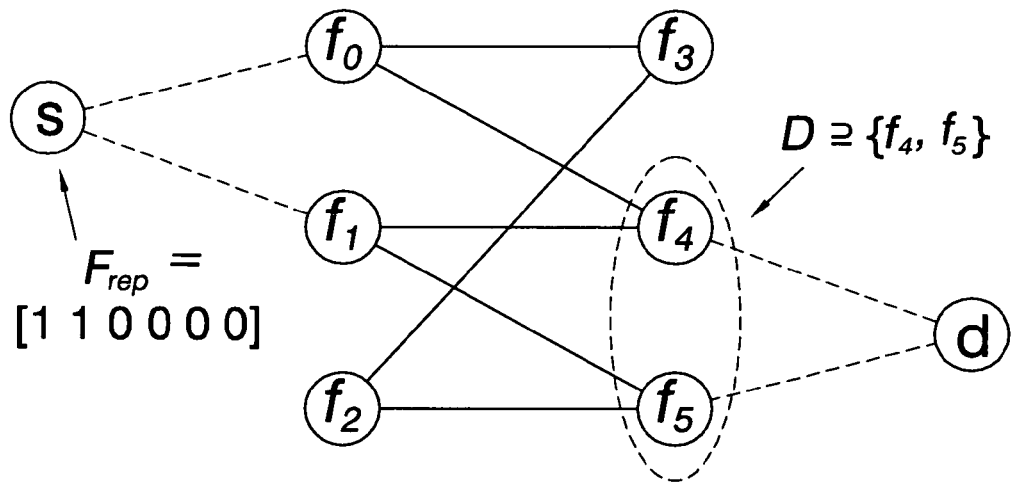
FIG. 5(b) is a graph showing illustrative source and destination.

To initialize the path, a user at source location s enters the backbone. FIG. 5(b) shows this aspect is conveniently achieved using $F_{rep}$, the input of the previously described localization process. Any visible Feature $f_v$ contained with $F_{rep}$ is a feasible access point. As long a $F_{rep}$ contains ≥1 visible Feature, the user can be directed on-net. Note that the "output" of the localization process, i.e., the "Region," is not needed. Consequently, the occasional localization ambiguity associated with discontiguous Regions is completely resolved during wayfinding.

Although the destination d is typically a backbone node, generality is preserved by allowing off-net destinations. In particular, envision a "meet-up" application where the destination is not a Feature, but another user who has entered his or her own $F_{rep}$. Leading the first user through the backbone to any "egress" node sighted in the second user's $F_{rep}$ puts the two users in mutual line-of-sight of each other. If for any reason d still cannot be found, the wayfinding procedure can resume. This example helps to formalize the routing goal.

DEFINITION 7 (PRIOR-HOPE DESTINATION). $\mathbb{D}$, a supernode containing the set of Features within the isovist of destination d DEFINITION 8 (FEASIBLE PATH). A sequence of hops among intervisible Features, beginning at a source s and ending at supernode $\mathbb{D}$.

Collapsing a subset of egress nodes into supernode $\mathbb{D}$ effectively reduces the number of vertices in graph G(h,e). The number of edges may also be reduced, but this is not guaranteed since the elements of $\mathbb{D}$ are not required to have edges among themselves. A node linked to multiple elements in $\mathbb{D}$ now has multiple parallel links to $\mathbb{D}$. Also, a corresponding ingress supernode cannot exist in general, because each access point may have different next-hop options within the backbone. Letting n=h−[$\mathbb{D}$]+1 results in the new graph G(n,e), with n≤h.

All links in G(n,e) are assigned a cost of 1. The overriding expense at each hop is the requirement of user interaction with the application. It was confirmed during field trials that users are tolerant of interaction, but it should be limited, assuming that users do not have unlimited patience. Other factors like physical distance do not strictly increase or decrease the cost. For example, two Features at different distances from the user may be equally easy to reach once sighted, but either Feature may lead to fewer interactions along the path to $\mathbb{D}$. For this reason, hop count is the metric selected to minimize the number of user interactions. G(n,e) can then be represented as a binary adjacency matrix $Adj_G$. The adjacency matrix of FIG. 5(b) follows, $$Adj_G = \begin{array}{c} \\ f_0 \\ f_1 \\ f_2 \\ f_3 \\ \mathbb{D} \end{array} \begin{pmatrix} f_0 & f_1 & f_2 & f_3 & \mathbb{D} \\ 0 & 0 & 0 & 1 & 1 \\ 0 & 0 & 0 & 0 & 1 \\ 0 & 0 & 0 & 1 & 1 \\ 1 & 0 & 1 & 0 & 0 \\ 1 & 1 & 1 & 0 & 0 \end{pmatrix}$$

The final component of the wayfinding model is link failure. At each hop through the network, adjacent next-hops may go unreported. The user cannot be directed toward an unreported next-hop, so this link is said to have "failed"; however, it should be appreciated that only the link, and "not" the "next-hop" node itself, has failed. That node may later be sighted, reported, and subsequently visited from a different vantage point within the network.

A Feature within the user's isovist goes unreported for any number of reasons, including: distance, size, lighting, another dominant or distracting element, errors in the underlying map, user fatigue, and even obstruction by the local Feature the user is departing from. Collecting all sources of error into a single independent probability of link failure, let q=Pr(Type II Error). Then, the probability a user successfully reports a Feature within his isovist is $p_v=1-q$.

Routing and simulation are next described beginning with routing strategy. At each hop, an underlying routing strategy determines which next hop to recommend. As in mobile ad-hoc wireless networks, the visibility wayfinding model must cope with high link failure rates and relatively local information. However, like traditional wired networks, a topology map is available in the form of $Adj_G$. Landmark routing, geographic routing, face routing, and even random routing have all been applied in varying degrees to related networking situations.

A simple greedy strategy is proposed, hereafter referred to as "Hop-by-Hop SPF." The occupied node j experiences selected user-induced failures of its "directly-connected" links. Any remaining edges of $Adj_G$ are assumed intact, because what future link failures will occur cannot be predicted. Dijkstra's shortest path algorithm is then invoked between node j and destination $\mathbb{D}$. After proceeding 1 hop, the newly occupied node is redefined as j.

Figure 6:
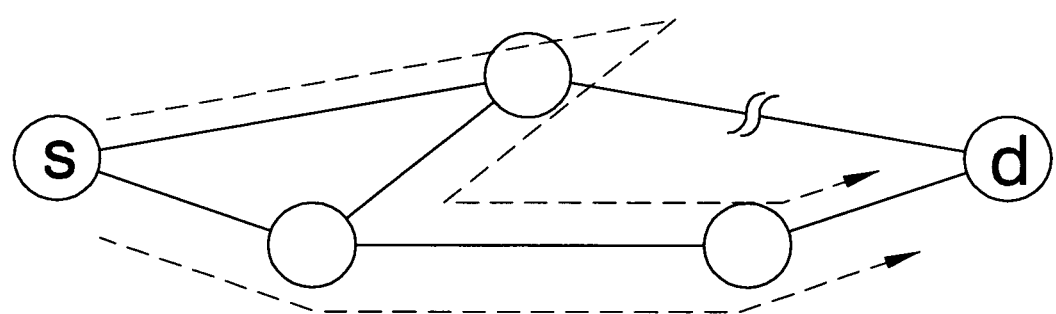
FIG. 6 is a graph showing an illustrative path.

Note that concatenating each Hop-by-Hop SPF decision may not reduce to the same route as an end-to-end shortest path calculation in which all network-wide failures have already occurred. The latter case amounts to having foreknowledge that is unavailable to Hop-by-Hop SPF, so its resulting path can be considered "Optimal" (see FIG. 6).

The expected performance of Hop-by-Hop SPF is evaluated by simulating room adjacency matrices of varying node density, edge density, and failure rate. Comparison against Optimal routing, both with and without link failures, provides two levels of lower-bound. "Random routing," implemented with hop-by-hop iterations as in Hop-by-Hop SPF, provides a form of upper-bound performances, i.e., the worst result without actively avoiding the destination. The simulations reveal parameters for which Hop-by-Hop SPF closely tracks Optimal routing. Field trails confirm the parameters are realistic and accurately reflect a real environment that was studied.

Simulation: In G(n, e), e is replaced by p, the independent probability that an edge appears between any two nodes; where p is equivalently the edge "density" of the graph. Erdös-Rényi random graphs G(n, p) are generated for all combinations of n={10,20,40,80} and p={0.125, 0.25, 0.5}. Every instance of G(n, p) is evaluated using Optimal routing, Hop-by-Hop SPF, and Random routing, under conditions of link availability according to $p_v$={0.25, 0.5, 0.75}. An additional case of Optimal routing immune to link failure, i.e., $p_v$=1, serves as a lowest-bound benchmark. Each test case is repeated on 1000 random graphs and the results averaged.

The performance measurement of each routing strategy on G(n, p, $p_v$) is provided by:

DEFINITION 9 (CHARACTERISTIC DISTANCE). $\overline{L}$, the average distance, in hops, among the feasible paths between all node pairs, resulting from a given routing strategy Of particular interest is both the distance of successful paths as well as "whether" paths are successful. As $\overline{L}$ is an average, it does not consider infinite paths. Link failures and randomness in the graph-generation process may result in critical node isolations, i.e., no feasible path, for a particular node pair. Therefore, every $\overline{L}$ is accompanied by $\overline{Inf}$, the average occurrence of infinite paths expressed as a ratio to the total $$\binom{n}{2}$$

potential paths.

A compact approximation of $\overline{L}$ can be prepared as follows:

$$\overline{L} \approx \frac{\ln n}{\ln k} \quad (7)$$

where k is the average degree per node in a graph. Eq. (7) can be adapted as a quick estimate of $\overline{L}$ for Optimal routing in G(n, p, $p_v$).

Given $$k = \frac{2e}{n},$$

let e be the number of edges remaining in $G(n, p, p_v)$ after all network-wide link failures have occurred. Then, $$e = p\binom{n}{2}p_v,$$

and substituting, $k = pp_v(n-1)$. Restating Eq. (7):

$$\overline{L} \approx \frac{\ln n}{\ln k} \quad (8)$$

$$\approx \frac{\ln n}{\ln(pp_v(n-1))} \quad (9)$$

$$\approx \frac{1}{1 + \log_n(pp_v)} \quad (10)$$

As Eq. (10) estimates $\overline{L}$ for Optimal routing, it also estimates the lower-bound of Hop-by-Hop SPF.

Figure 7:
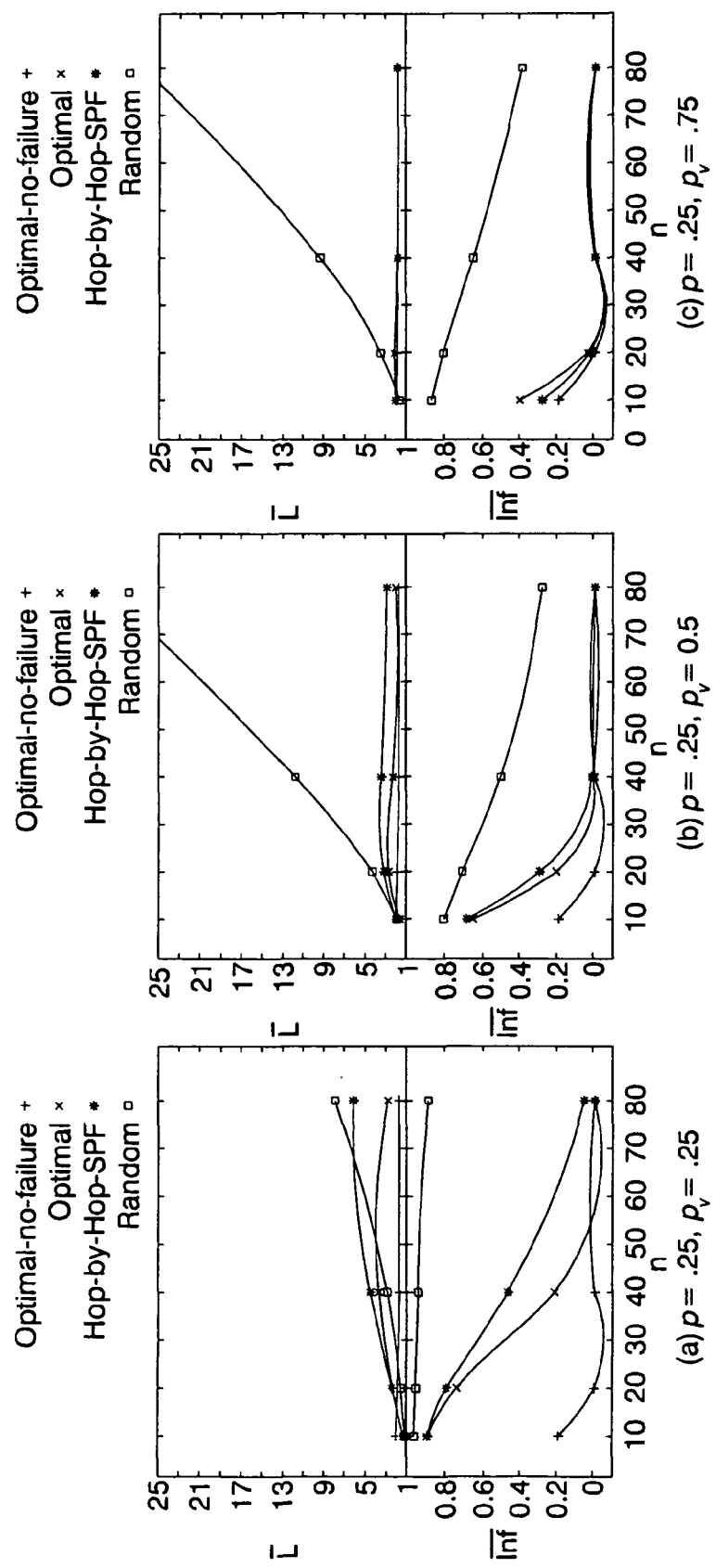
FIG. 7(a)-(c) are graphs showing illustrative data for characteristic distance.

FIG. 7 plots $\overline{L}$ and $\overline{\text{Inf}}$ as n increases. For space and clarity, density p is held constant at 0.25, the center of the test range. Maintaining constant density as n varies also reflects reality. Adding a new Feature to a room immediately offers up to n new edges. Thus, the growth in edges has a proportional relationship with n.

Random routing sets a quasi-linear upper-bound on $\overline{L}$ for the test range, implying that Hop-by-Hop SPF should perform sublinearly, FIGS. 7(b) and 7(c) show that for $p_v \geq 0.5$, not only does Hop-to-Hop SPF offer sublinear growth, $\overline{L}$ tends to "decrease." In fact, for $n \geq 20$, Hop-by-Hop SPF closely tracks Optimal routing in both $\overline{L}$ and $\overline{\text{Inf}}$.

Consider $G(n=20, p=0.25, p_v=0.5)$, Eq. (10) predicts a lower-bound of $\overline{L}=3.27$ hops. The simulation results in $\overline{L}=2.87$ for Optimal routing, $\overline{L}=3.31$ for Hop-by-Hop SPF, representing a stretch of only 15%. Increasing n to 40 brings $\overline{\text{Inf}}$ below 2% for both cases. Thus, Eq. (10) reasonably approximates the lower-bound, Hop-by-Hop SPF is an effective routing strategy, and the performance of visibility wayfinding improves as complexity in the room increases.

Figure 4B:
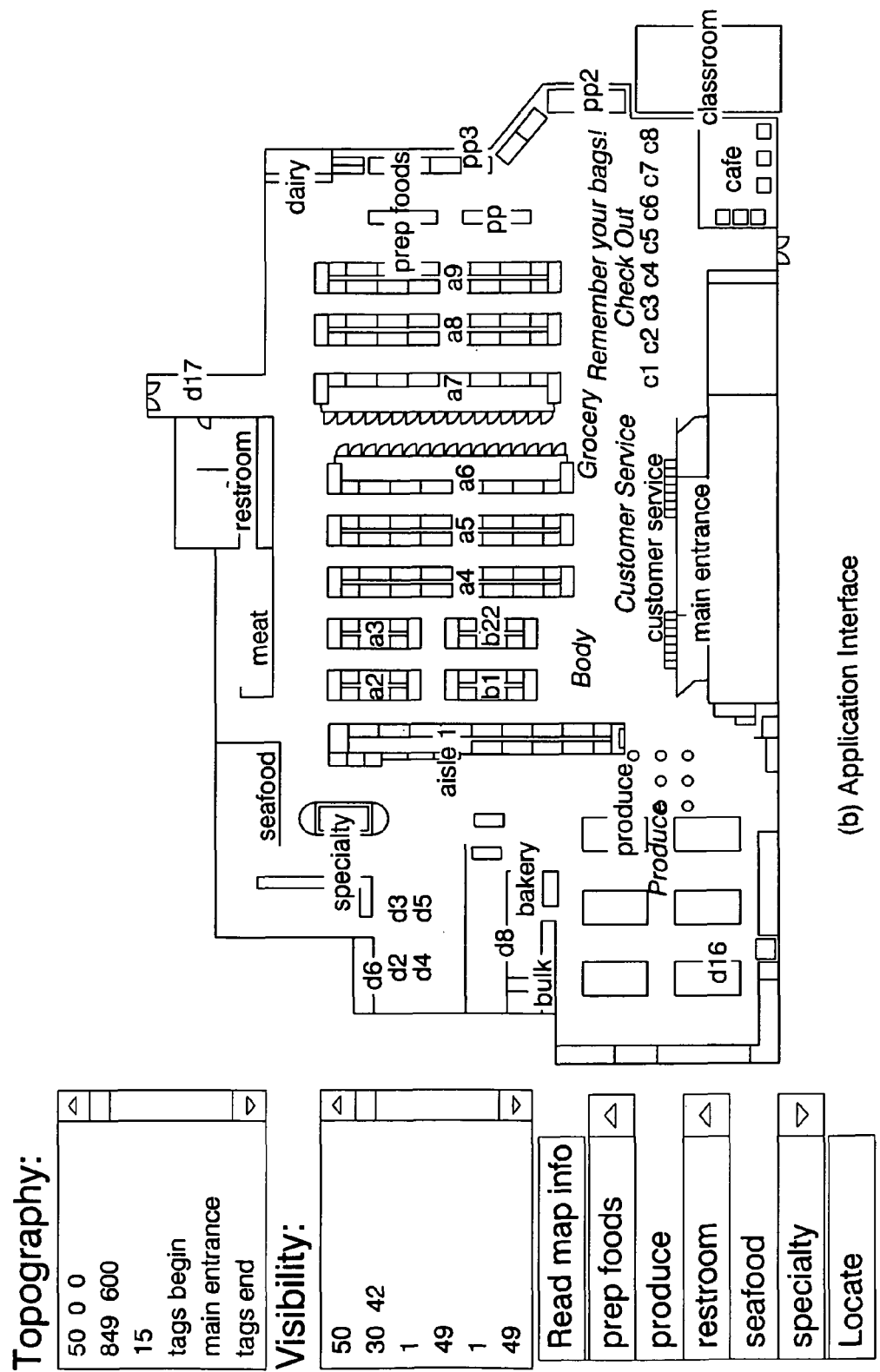
FIG. 4(b) is one example of an application interface.
Figure 8:
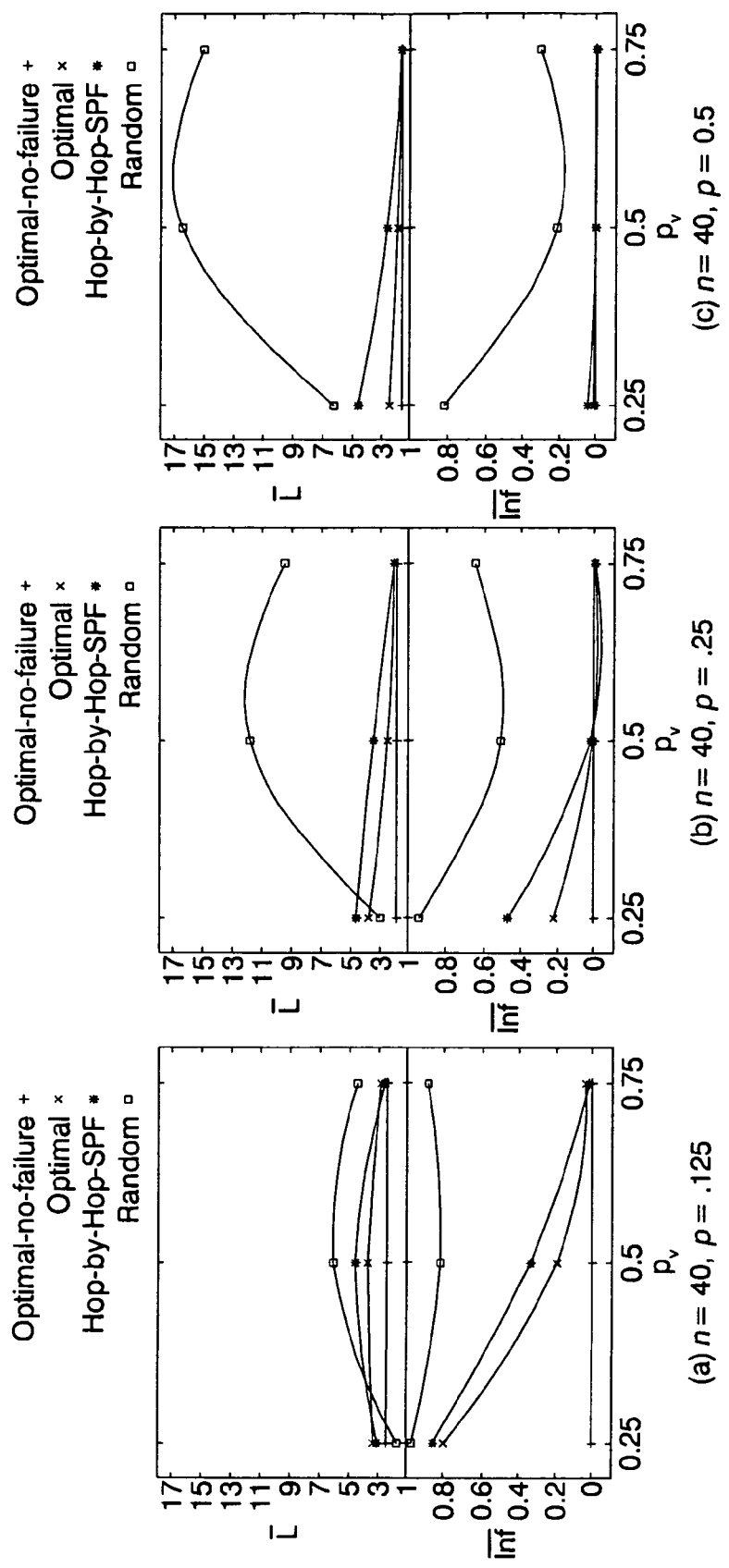
FIG. 8(a)-(c) are graphs showing illustrative data for characteristic distance.

FIG. 8 plots $\overline{L}$ and $\overline{\text{Inf}}$ vs. $p_v$. Here density p is varied between poorly connected and extremely well-connected networks. For space and clarity, n is held constant at 40, the center of the test range. This value of n has particular relevance due to its agreement, with the observed node number in both of the real floorplans studied. Recall that h represents the number of Features in an indoor environment, and n=h when supernodes are ignored. The supermarket of FIG. 4(b) has h=43, $\overline{P}=0.005$ (Accumulative Reporting) and the convention center of FIG. 10 has h=38.

For n=40, Hop-by-Hop SPF closely tracks Optimal routing in $\overline{L}$, regardless of p or $p_v$. In $\overline{\text{Inf}}$, however, only for $p_v \geq 0.5$ does Hop-by-Hop SPF become relatively low and near-Optimal. This result implies that link availability $p_v$'s effect is strongest on "whether" the user reaches the destination, rather than how long the path is. Revisiting FIG. 7, the same behavior can be observed. Further, the assumption of independence for p and $p_v$ implies that performance should be similar for graphs with the same product $pp_v$, even if p and $p_v$ are interchanged.

Inspecting the full dataset of Hop-by-Hop SPF for all $G(n, p, p_u)$ (not illustrated) reveals consistently low $\overline{L}$, but distinct regions of very high and very low $\overline{\text{Inf}}$. The $\overline{\text{Inf}}$ data can be separated into 2 subsets, one of poor performers with minimum value of 24% and the other of good performers with maximum value of 5%. This represents a sharp transition, with low values appearing when $$pp_v > \frac{\ln n}{n}.$$

This corresponds to a well-known threshold beyond which random graphs are typically connected. Accordingly, $\overline{\text{Inf}}$, more so than $\overline{L}$, is the limiting factor as to whether visibility wayfinding, is effective. Therefore, for indoor environments where $$pp_v > \frac{\ln n}{n},$$

good performance is predicted in both $\overline{L}$ and $\overline{\text{Inf}}$.

Complexity: For the graph G(n, e), with n nodes and e edges, Dijkstra's shortest path algorithm runs in O(e log n). Hop-by-Hop SPF requires, at worst, n−1 iterations of Dijkstra if the sequence of failures forces a user through all nodes. Therefore, Hop-by-Hop SPF results in O(ne log n). However, each iteration need not operate on the entire G(n, e) if routing loops are prohibited. At each hop, the previous node and at least 1 edge are removed from the graph.

Let $c \leq 1$ be a constant fraction. After cn iterations, at worst (1−c)n nodes and e−cn edges remain. The remainder of the computation is then O((1−c)n(e−cn) log((1−c)n)) ⇒ O(ne log n). Therefore, the full computation over all iterations is still Ω(ne log n). However, most of the time the worst case does not occur. Typically, each iteration removes more than 1 edge, so insight is gained by considering the typical number of edges per node.

Let $$k = \frac{2e}{n}$$

be the average degree per node in G(n, e). The average computation over all iterations is:

$$O\left(\sum_{i=0}^{n} e_i \log(n-i)\right) \quad (11)$$

Where $e_0 = e_1$ and $$e_i = e_{i-1} - \frac{2e_{i-1}}{n+1-i}.$$

It should also be appreciated that typically, all n nodes are not visited. Let $m \leq n$ be the true number of nodes visited, occurring with probability $$\frac{1}{n}.$$

Eq. (11) becomes:

$$O\left(\frac{1}{n}\sum_{m=1}^{n}\sum_{i=0}^{m}e_i\log(n-i)\right) \quad (12)$$

Figure 9:
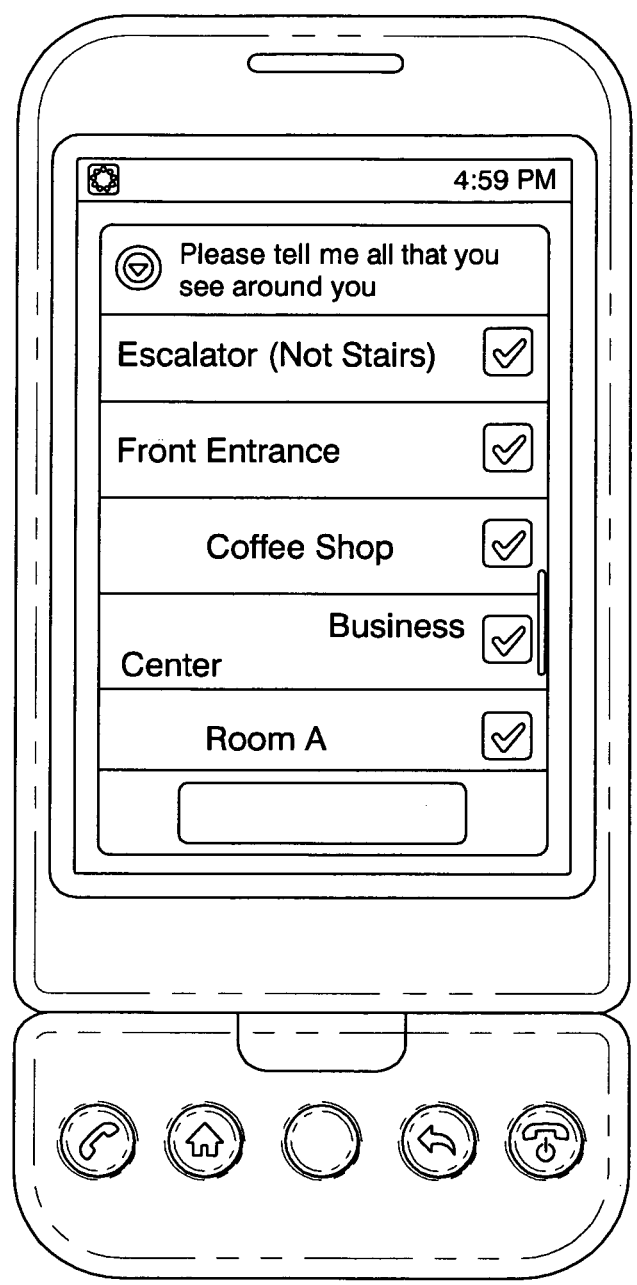
FIG. 9 is an image of prototype application used during trials.

The Hop-by-Hop SPF algorithm has been implemented on a commercially available mobile phone, and users report no discernible lag. On-site user studies were conducted at a large convention center using a real online floorplan. The application prototype is implemented on a commercial mobile phone, the HTC Android Development 1. The application interface is depicted in FIG. 9. Users are given a selection of Features with checkboxes. The first prompt offers all Features, resulting in the user-reported Feature Vector $F_{rep}$. $F_{rep}$ initializes both localization and wayfinding. Localization follows immediately, whereas for wayfinding, the user is offered the opportunity to select a desired destination. Hop-by-Hop SPF then recommends the user proceed to a sighted Feature and confirm arrival. Each subsequent iteration offers only the subset of Features within the precomputed isovist, corresponding to adjacencies in matrix $Adj_G$. Upon arrival at a node within 1 hop of the destination, the user is asked to confirm whether the destination is visible. If not visible, the user may continue or abort the process.

Operation is essentially self-explanatory, and test subjects had no trouble learning the interface. Many potential improvements were identified during the experiments, some of which have already been incorporated into a prototype experimental model, described further hereinafter.

The test site is a large hotel and convention center frequented by business travelers. The scope was limited to the main level, rather than the guest rooms. The main level consists of numerous leisure and meeting areas used to host conferences and other events. Users of the venue are often first-time visitors who have a particular destination to find. For example, someone leaving the elevator may need to print documents at the business center on their way to finding a meeting room. The convention center offers certain attractive characteristics for testing. First, and most important, is the availability of a free online floorplan. In addition, it has a combination of labeled and unlabeled Features. Labeled Features include anything with a sign, such as meeting rooms. Unlabeled Features have no sign but are identifiable, such as an escalator. Features were identified within the interior space, as well as along the perimeter. Finally, there are distinct wings to the building, rather than just a single large room.

Figure 10:
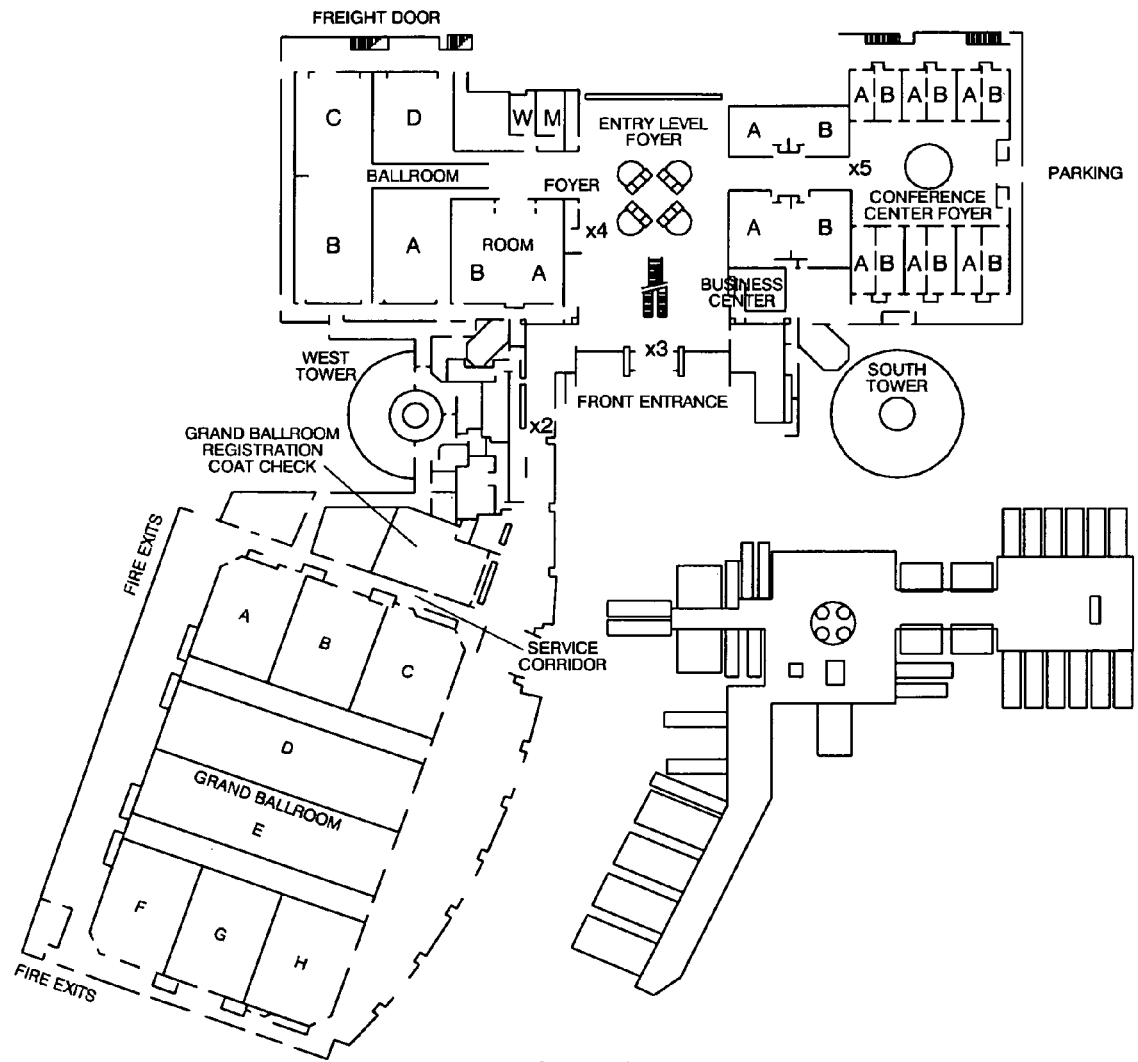
FIG. 10 is a floorplan of a test site.

Tests were conducted starting at 6 pm on a weekday, by request of the venue's management. At this time of day, hotel guests were still present on the main level, but not so many that our testing would be considered intrusive. One consequence of this timeframe was an unforeseen switch to "soft" lighting. This lighting made some signs harder to read, resulting in a detrimental effect on certain Features' identifiability. Results would improve, of course, during the daytime lighting conditions of any typical supermarket, airport, convention center, shopping mall, etc. Nevertheless, our findings are already encouraging. FIG. 10 shows the original floorplan, as well as the streamlined version used for computation. Maps are anonymized by blurring any obvious identifiers.

Test subjects consisted of 10 volunteers ranging in age from 21 to 45 years, with mean 28.5 and median 26.5. None of the testers had previously been to the test site, none had prior knowledge of the graph adjacency matrix, and none had prior knowledge of the specific tests that would be conducted. They were aware the study involved an "indoor GPS" system using a mobile phone. Most parameters influencing the system are extracted directly from the processed floorplan. Visibility localization depends chiefly on h, the number of identifiable Features in the environment. Visibility wayfinding depends on h (or n nodes), edge density p, and $p_v$. After processing the convention center, it was found h=38 and p=0.283. An approximate threshold of h≥20 was used for good localization precision; where h=38 establishes that it is realistic to find floorplans satisfying the threshold.

Figure 11:
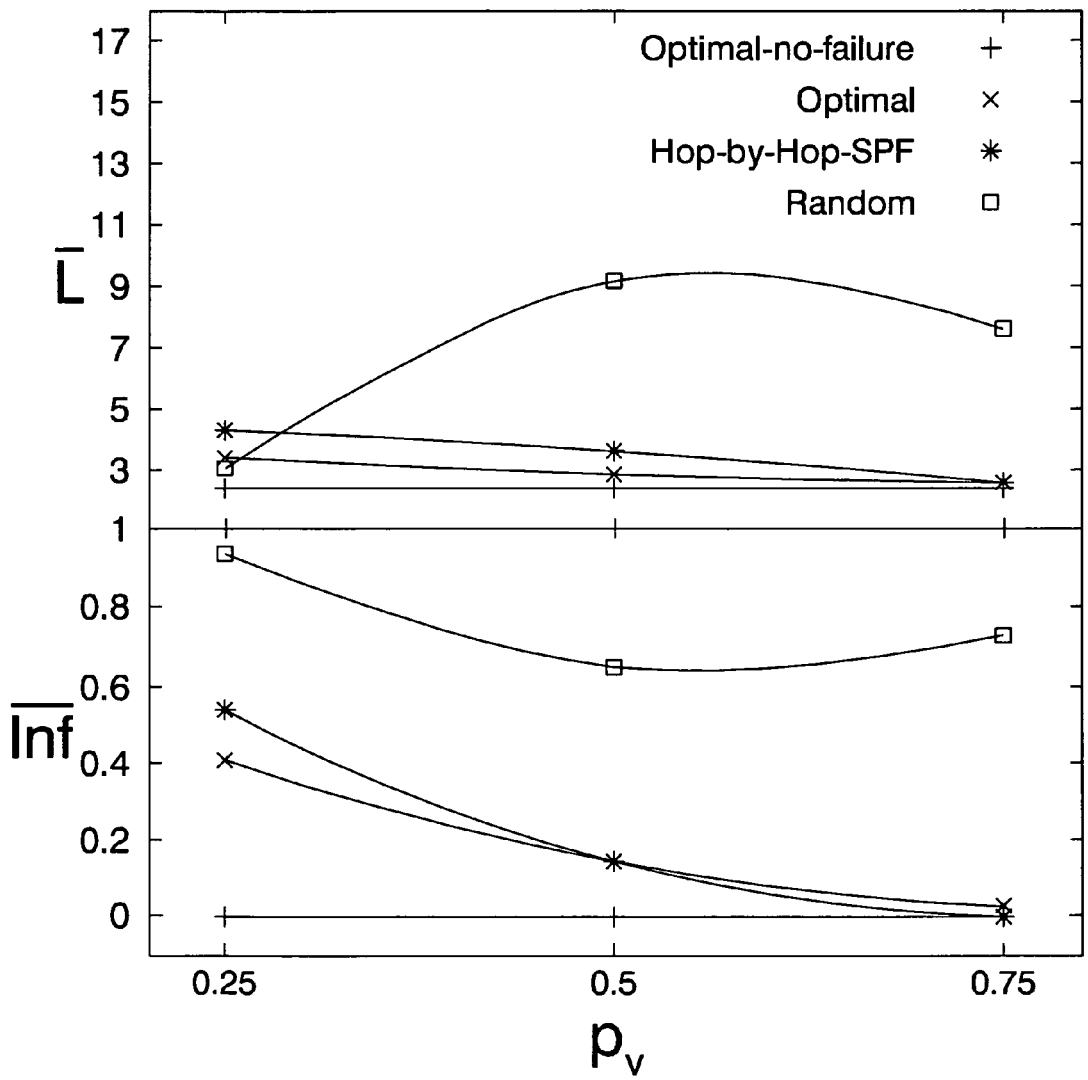
FIG. 11 is a graph showing illustrative data for characteristic distance.

The most uncontrollable factor of interest is $p_v$, the probability a Feature is reported, given that it is within the user's computed isovist. Subjecting the convention center's adjacency matrix to the analysis previously described establishes reasonable benchmarks by which to compare our results. FIG. 11 shows the expected behavior of the convention center for various $p_v$, given h (or n)=38 and p=0.283. A strong correspondence between the real matrix of FIG. 11 and the random matrices of FIG. 8(*b*) was observed. In FIG. 8(*b*), n=40 and p=0.25, parameters approximate those of the real test site. The agreement between these figures suggests the simulation environment is valid, and $$\frac{\ln n}{n}$$

predicts $pp_v$ should exceed 0.096 to achieve near-Optimal path length and path failure rate. For p=0.283, this requires $p_v$>0.339. FIG. 11 suggests $p_v$ should be higher, around 0.5.

The first test, therefore, attempts to estimate $p_v$. The second test investigates usability of the application—whether users successfully reach destinations, and how many hops were required. Using a uniform randomly generated binary matrix superimposed over the test site floorplan, 5 random coordinates within the occupiable space were chosen as vantage points. These vantage points are labeled $x_i$ in FIG. 10. Isovists $V_{x_i}$ and Feature Vectors $F_{x_i}$ were computed, generating lists of the Features that should be visible from each $x_i$. The various $F_{x_i}$ range in length from 4 to 18 Features.

Every volunteer was tested from every vantage point, producing 50 readings. Test subjects were placed at the vantage point by an administrator and provided a list akin to FIG. 9 containing the Features within $F_{x_i}$. Each reading was then recorded as the percentage of boxes checked by the test subject. In addition to the "Check all that apply" written instructions, verbal instructions were given stating, "You may turn around in a circle while determining what you see, but you may not leave the vicinity of this position to seek out anything on the list."

There is a purpose in testing each volunteer at multiple vantage points. The same person may respond differently to different environments, so our data set captures both inter-user and intra-user diversity. Some correlation among readings were observed from the same test subject; some eagerly sought to complete the list accurately, while others were satisfied after a few sightings. However, intra-user readings still have high variance among the different vantage points, so each reading is treated as independent.

The vision test resulted in p=0.496. Applying the t-distribution, as is customary for small-sample studies, if was found at the 90% confidence level that p>0.46. This is well above 0.339, the quality threshold previously discussed. It is also close to 0.5, the value suggested by FIG. 11. As a result, the values of h, p, and $p_v$ necessary for good performance in both localization and wayfinding are realistic and do arise in practice.

The wayfinding test is a live proof-of-concept. While path lengths and success rates are measured, the focus is on users' ability and willingness to operate the application. At the conclusion of the study, volunteers offered valuable feedback which has already influenced future improvements. Given the constraints of equipment and volunteers, it was impractical to test all $$\binom{38}{2} = 703 \text{ node pairs.}$$

Also, random generation of pairs often results in nodes already quite close to each other. For the purpose of testing, "interesting" paths are desired that reveal more about the underlying behavior. The focus here is on 2 long paths that required users to find a destination in a different wing of the building. The paths represent normal operation with varying levels of performance.

Each volunteer was given the mobile phone and placed at preselected starting locations. The starting locations were intentionally chosen to differ from the vantage points $x_i$ described for visibility reporting previously. This approach provided some insulation, although imperfect, against learning from the previous test. An administrator entered the preselected destination, and then briefly reviewed the device operation including use of the touchscreen. The administrator instructed the volunteer to begin, and provided no further assistance.

The test proceeded as modeled by FIG. 5(b). From off-net starting location s, the first prompt offers all Features. $F_{rep}$ leads the user on-net. Subsequent iterations offer only adjacent Features until arrival at supermode $\mathbb{D}$, any node within 1 hop of the final destination d. Upon arrival at $\mathbb{D}$, the test subject confirms whether they do or do not see d. The administrator recorded the number of hops from s to $\mathbb{D}$, and the result of the final confirmation.

Test subjects had no difficulty using the application, and proved quite tolerant of interaction. Some diligently searched for Features to report, as though playing a game. Others made rapid, incomplete reports in order to proceed quickly through the path. Successful paths reached as many as 7 hops, with no complaints about the level of interaction. Only when users felt they were looping did they question the application's recommendations. These and other insights are discussed hereinafter. The findings indicate that requiring user-interaction is not unreasonable. Without installing infrastructure or conducting a detailed site survey, most paths for most users are successfully navigable based only on the free online floorplan.

Path 1: Optimal routing with no error predicted a 2 hop path from s to $\mathbb{D}$, 3 hops total from s to d. Test subjects averaged 3.13 hops from s to $\mathbb{D}$, with standard deviation 1.47. From $\mathbb{D}$, 100% successfully identified the final destination d on the first try. 1 test subject aborted the process due to difficulty distinguishing between an "escalator" and a "staircase," resulting in an infinite path.

Path 2: Optimal routing with no error predicted a 2 hop path from s to $\mathbb{D}$, 3 hops total from s to d. Test subjects averaged 4 hops from s to $\mathbb{D}$, with standard deviation 1.79. From $\mathbb{D}$, 80% successfully identified the final destination d on the first try. No infinite paths were observed.

Reaction to the application was positive. Volunteers found it easy to understand and operate. The most frequent suggestion was to shorten the list of Features. The current design fits only 5 Features on-screen at once, so very well-connected nodes required users to scroll through the list. An update has since been developed in which only the "5 best" Features are listed on-screen. This modification has the effect of shortening the list as well as focusing attention on hops that improve the user's position. In the original implementation, users were sometimes led "away" from the destination if they only reported "worse" next-hops.

Among all hops and reports across both tests, only 2 instances of Type I error were recorded. One case was an accidental mis-key of the touchscreen. It was noticed only because the mis-keyed Feature happened to be chosen as the next-hop. The other case was described previously in connection with Path 1. The test subject confused an "escalator" with a "staircase." While rare, it is not impossible, for a user to report a Feature they do not see.

Some Features computed to be intervisible according to the floorplan were, in reality, invisible to each other, but had no negative effect for features with links to multiple other Features—users were simply routed another way. In one case, however, a disconnected link was uncovered with no redundant alternative. Paths containing this link would have encountered a node isolation. Specifically, a required next-hop Feature was concealed within a long narrow hallway, when it would have been more effective to name the "narrow hallway" itself as a Feature. Although a detailed site-survey is not necessary, a basic walk-through to check for extreme cases could be conducted to address this type of issue.

The prototype allowed loops. Looping was observed, but generally not infinite loops. As loops occurred, users realized they should alter their reports to break free. The application has been updated to disallow crossing the same link twice, which prevents infinite loops while still allowing a node to be revisited from a different direction. The second time a node is visited, the user may notice Features that were previously missed.

In some cases, users questioned the application's recommendation if the next-hop "seemed" to be in the wrong direction. Although the next-hop may have been the true "best" option, its unexpectedness caused confusion, which may be addressed by providing an anticipatory warning of it in the instructions. In addition, an option has been added where the user may "refuse" any next-hop. The application then recommends the second-best option, and so on.

The field trials yielded valuable insights that have already led to improvements. Test 1 estimated $p_v$ while Test 2 established that users are willing and able to interact with the application. For a further embodiment, an optional feedback mechanism is being developed by which users can tag new Features. The user-generated update is uploaded to the map server, resulting in collaborative improvement of the map. Localization precision improves as a result, and more destinations are available for wayfinding. In particular, testers have expressed interest in finding specific items within areas. For example, upon arrival at the dairy section, the user would be directed to the subsection containing eggs. By allowing user-tagging, such specificity may be achievable. As an alternative or addition to text-tags, phototags could be utilized in certain embodiments. Cameras have become a standard feature on most mobile phones, including the one used for this study. Phototags help to resolve semantic ambiguity arising from users' differing descriptions. These photos would be displayed as expandable thumbnails in the on-screen list of Features.

Figure 9A:
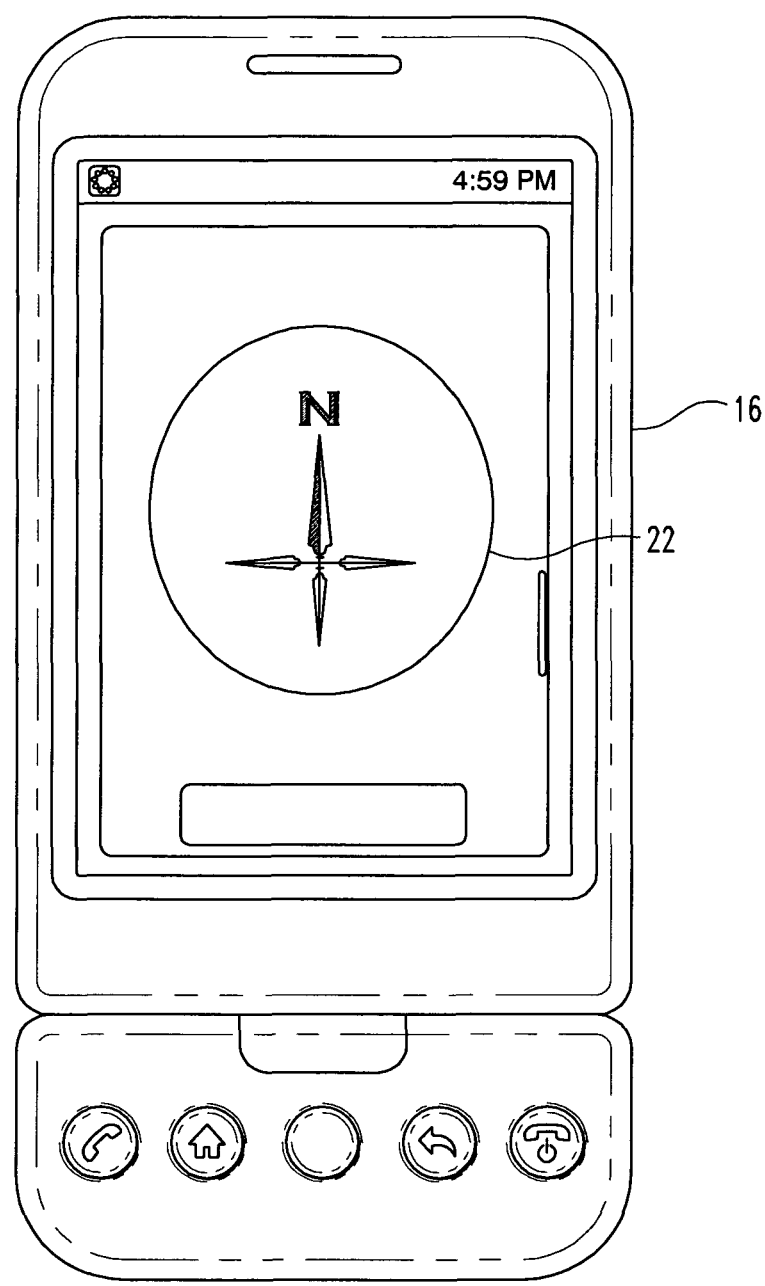
FIG. 9(a) is an exemplary device with a compass.

Still a further embodiment takes advantage of the mobile phone's on-board compass as seen in FIG. 9(a). At the final hop, when the user confirms whether destination d is or is not visible, a compass display 22 can point the user's gaze in the general direction of d. Various ways have been considered to expand the role of the compass, but this function is not widely available on most phones. The compass itself is very sensitive to electrical noise and orientation, so it was limited to use to the final hop.

Yet a further embodiment provides a web-based external user interface to the map server. Rather than depending on administrators to seek out public floorplans, users will have the ability to find and upload their own. Once uploaded, a graphical interface allows the user to identify and tag Features. For instance, clicking "submit" initiates server-side processing of the floorplan into the computational map. The processed map is then downloadable by other users. This tool gives the system a growth potential far exceeding the reach of administrators alone.

In another embodiment, a localization and/or wayfinding technique includes providing a device that executes a process to query the user for limited information about what he or she sees. In the localization case, the application displays the likely location on a map. For wayfinding, the user is directed to proceed iteratively towards the destination. This device can be in the form of a mobile phone, Personal Digital Assistant (PDA), smartphone, or other handheld device. The map can be a preprocessed version of a free, publicly available online floorplan. In one implementation, such preprocessing can include a determination of likely visibility relationships among identifiable features in a room, and encode the map into a set of coordinates, corresponding feature vectors, and a feature adjacency matrix. The user can preload the map or download it live via a 3 G/4 G data connection, or load it over other wireless or hardwired link. Notably 3 G/4 G data transmission, unlike GPS, much more effectively penetrates most buildings. Techniques such as these can take advantage of visibility relationships, limited user-input, publicly available online floorplans, and lightweight processing on devices that users would typically carry in such indoor environs; and need not depend on infrastructure or site-surveys. It should be appreciated that performance can improve with complexity in the environment. Moreover, users can actually participate in improving the system via an optional network feedback mechanism.

Another embodiment of the present application is a method, which includes: designating a destination of a user inside a building with a portable handheld device; determining a number of visual cues based on the destination, the visual cues each corresponding to a viewable aspect inside the building; providing a first set of the visual cues to the user through the device; directing the user from a first location to a second location inside the building based on the first set of the visual cues; providing a second set of the visual cues to the user through the device; and directing the user from the second location to a third location inside the building based on the second set of the visual cues.

Other features of the embodiment may include one or more of the following: downloading a map of the building onto the device; the portable handheld device is a smartphone; wirelessly downloading the visual cues to the portable handheld device; providing the visual cues from a website over a 3 G or 4 G data network; processing a map of an indoor space of the building with a computing device; providing a localization of the user in the building; providing the localization includes determining a region based on visual cues identified by the user; at least one of the visual clues includes a digital image of the likeness of a feature within the building; controlling a compass to point in a direction of the destination; and/or displaying the map on device.

Yet another embodiment of the present application includes an apparatus having: a wireless transceiver; and a processing device operatively coupled to the wireless transceiver, the processing device being structured to execute operating logic to download a map of an inside of a building, wherein the map is encoded with a set of coordinates and corresponding features; provide a plurality of features to a user to select the features that are visible to the user in the building; and direct the user along a path to a destination based on the selected features.

Other features of the embodiment may include one or more of the following: means for displaying a digital image of the likeness of at least one of the features within the building; and/or a compass to point in a direction of the destination.

Another embodiment of the present application includes a method having the following features: designating a destination inside a building with a handheld portable device; selecting a number of different visual cues to provide to a user of the device based on the destination, the visual cues each corresponding to a different feature viewable by the user inside the building;

directing the user from one location to another location inside the building by traveling in a sequence of several hops in response to the different visual cues and the user reaching the destination through the sequence of hops.

Other features of the embodiment may include one or more of the following: downloading a map of the building from a website over a 3 G or 4 G data network onto the device, and displaying the map on the device; providing a localization of the user in the building; and/or at least one of the visual clues includes a digital image of the likeness of a feature within the building.

Yet another embodiment of the present application includes a system having a computing device to provide several visual cues based on a map of an indoor region; and a portable handheld device operable to provide a user thereof the indoor visual cues to direct the user to an indoor destination by user-identification of a number of intermediate locations based on the visual cues.

Other features of the embodiment may include one or more of the following: the computing device is a server; the portable handheld device is a smartphone; means for processing the map to generate the indoor visual cues; means for wirelessly communicating the visual clues to the portable handheld device; and/or means for localizing the user.

Any experimental (including simulation) results are exemplary only and are not intended to restrict any inventive aspects of the present application. Any theory, mechanism of operation, proof, or finding stated herein is meant to further enhance understanding of the present application and is not intended to make the present application in any way dependent upon such theory, mechanism of operation, proof, or finding. Simulations of the type set forth herein are recognized by those skilled in the art to demonstrate that methods, systems, apparatus, and devices, are suitable for their intended purpose. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any claims that follow are desired to be protected.

What is claimed is:

1. A method, comprising:
designating a destination of a user inside a building with a portable handheld device that includes a processing device;
determining a number of visual cues based on the destination, the visual cues each corresponding to a viewable aspect inside the building;
providing a first set of the visual cues to the user through the portable handheld device;
directing the user from a first location to a second location inside the building based on the first set of the visual cues;
providing a second set of the visual cues to the user through the portable handheld device; and
directing the user from the second location to a third location inside the building based on the second set of the visual cues.

2. The method of claim 1, further comprising:
downloading a map of the building onto the portable handheld device.

3. The method of claim 2, further comprising:
displaying the map on the portable handheld device.

4. The method of claim 1, wherein the portable handheld device is a smartphone.

5. The method of claim 1, further comprising:
wirelessly downloading the visual cues to the portable handheld device.

6. The method of claim 1, further comprising:
providing the visual cues from a website over a wireless data network.

7. The method of claim 1, further comprising:
processing a map of an indoor space of the building with a computing device.

8. The method of claim 1, further comprising:
providing a localization of the user in the building.

9. The method of claim 8, wherein providing the localization includes determining a region based on visual cues identified by the user.

10. The method of claim 1, wherein at least one of the visual clues includes a digital image of the likeness of a feature within the building.

11. The method of claim 1, further comprising:
controlling a compass to point in a direction of the destination.

12. An apparatus, comprising:
a wireless transceiver; and
a processing device operatively coupled to the wireless transceiver, the processing device being structured to execute operating logic to download a map of an inside of a building, wherein the map is encoded with a set of coordinates and corresponding features; provide a plurality of features to a user to select the features that are visible to the user in the building; and direct the user along a path to a destination based on the selected features.

13. The apparatus of claim 12, further comprising:
means for displaying a digital image of the likeness of at least one of the features within the building.

14. The apparatus of claim 12, further comprising:
a compass to point in a direction of the destination.

15. A method, comprising:
designating a destination inside a building with a handheld portable device that includes a processing device;
selecting a number of different visual cues to provide to a user of the portable handheld device based on the destination, the visual cues each corresponding to a different feature viewable by the user inside the building; and
directing, with the portable handheld device, the user from one location to another location inside the building by traveling in a sequence of several hops in response to the different visual cues and the user reaching the destination through the sequence of hops.

16. The method of claim 15, further comprising:
downloading a map of the building from a website over a 3G or 4G data network onto the portable handheld device; and
displaying the map on the portable handheld device.

17. The method of claim 15, further comprising:
providing a localization of the user in the building.

18. The method of claim 15, wherein at least one of the visual clues includes a digital image of the likeness of a feature within the building.

19. A system, comprising:
a computing device to provide several visual cues based on a map of an indoor region; and
a portable handheld device operable to provide a user thereof the indoor visual cues to direct the user to an indoor destination by user-identification of a number of intermediate locations based on the visual cues.

20. The system of claim 19, wherein the computing device is a server.

21. The system of claim 19, wherein the portable handheld device is a smartphone.

22. The system of claim 19, further comprising:
means for processing the map to generate the indoor visual cues.

23. The system of claim 19, further comprising:
means for wirelessly communicating the visual clues to the portable handheld device.

24. The system of claim 19, further comprising:
means for localizing the user.

* * * * *